March 10, 1925.
W. O. EDDY
1,529,349
PROCESS FOR TREATMENT OF OIL EMULSIONS
Filed May 7, 1923
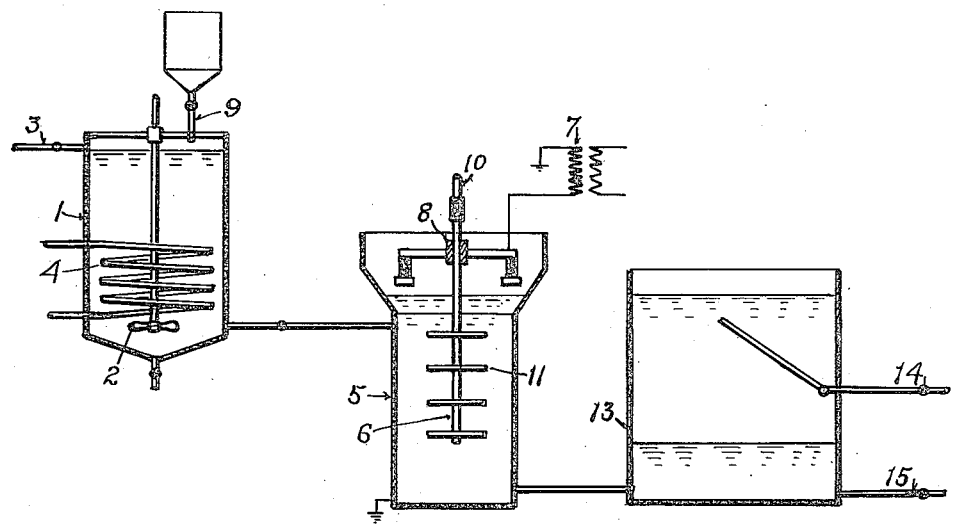
INVENTOR.
William O. Eddy
BY Arthur P. Knight
ATTORNEY.

Patented Mar. 10, 1925.

1,529,349

UNITED STATES PATENT OFFICE.

WILLIAM O. EDDY, OF LONG BEACH, CALIFORNIA.

PROCESS FOR TREATMENT OF OIL EMULSIONS.

Application filed May 7, 1923. Serial No. 637,357.

*To all whom it may concern:*

Be it known that I, WILLIAM O. EDDY, a citizen of the United States, residing at Long Beach, in the county of Los Angeles and State of California, have invented a new and useful Process for Treatment of Oil Emulsions, of which the following is a specification.

This invention relates to treatment of emulsions of oil and water and particularly emulsions containing petroleum or a product thereof.

The main object of the present invention is to provide for separation or breaking of emulsions of this character more economically and effectively than with processes now in use.

A further object of the invention is to provide for breaking or separation of the constituents of emulsions which are not amenable to the de-emulsifying or dehydrating operations used at the present time.

The accompanying drawing illustrates an apparatus suitable for carrying out my process, said drawing being a vertical section of such apparatus.

In the treatment of petroleum emulsions by the so-called electrical dehydration process, in which the emulsions are subjected to the action of a high tension electro-static field and to a settling operation, it has generally been found necessary or desirable to heat the emulsion to a rather high temperature, in order to permit effective dehydration. This results in a considerable loss of volatiles, such as gasoline, and is wasteful and undesirable on that account, and also objectionable on account of the danger involved and the undue expense of the heating operation. Furthermore some petroleum emulsions or emulsions of water and petroleum products, for example tank bottoms, can not be effectively dehydrated, by electrical dehydration within practical limits of temperatures.

However, I have found that by treating the emulsion with certain chemicals that the physical or other properties of same are changed in such way that the electrical dehydration may be effectively performed at a lower temperature than would otherwise be necessary, and I have also found in some cases petroleum or emulsions of water and petroleum product which are not amenable to successful electrical dehydration in the natural state can be so changed in character by addition of the aforesaid chemicals or modifying agents as to enable the electrical dehydration to be effectually carried out thereon. The modifying agents I have used have the effect of changing or modifying the interfacial tension of the petroleum and water and it is assumed that this is the necessary and sufficient condition for the modifying agent to be effective in the treatment of the emulsion so as to render it more susceptible to economical and effective electrical dehydration.

Various chemicals or modifying agents may be used for example sodium oleate, calcium oleate, magnesium oleate, ammonium hydroxide, phenol, sodium resinate, and various soaps and resins, and in general, any substance capable of changing the interfacial tension of the petroleum and water emulsion. For rapid and effective operation, it is desirable that the modifying means should be soluble in one of the phases of an emulsion, preferably the external phase. This however is not essential as I have found that a modifying agent insoluble in one of the constituents may be brought into sufficiently effective contact with the emulsion by agitation to change the interfacial tension sufficiently to enable electrical dehydration to be effectively carried out.

A modifying agent which I have used with success has the following composition; the constituents named being mixed to form a solution in the proportion by weight as follows: Sulfonated oleic acid 50, denatured alcohol 20, ammonium hydroxide 10, phenol 5, sodium resinate solution 5 (contains 11% rosin with corresponding amounts of alkali). Or I may use sodium oleate, either dry or in alcoholic solution, or calcium oleate, either dry or dissolved in oil.

The modifying agent, either in dry condition or in solution as above described, is mixed with emulsion to be treated, either in a suitable mixing apparatus such as an agitating tank indicated at 1 in the drawing and having means, for example, a rotating agitating paddle 2, which agitates and circulates the mixture. The emulsion may be supplied to the mixing tank 1 by a pipe line 3, and the modifying agent may be introduced into said tank, or in case the emulsion is supplied by pumping, it may be introduced into and mixed with the solution by feeding it to the suction pipe of the pump which forces the emulsion to the treating apparatus. The emulsion may be heated to the desired temperature either before, during, or after the mixing operation, for example by a steam coil indicated at 4. An amount of the modifying agent from one fourth to one half of that necessary for treating the emulsion with the modifying agent alone is sufficient to permit effective dehydration by electrical treatment. For example I may use from one twentieth gram to one tenth gram of modifying agent per gallon of emulsion, depending on the characteristics of the emulsion. With emulsions that cannot be effectually broken by the use of chemicals alone, the amount of modifying agent used may be from two tenths gram to eight tenths gram per gallon of the emulsion to be treated, and I have obtained satisfactory results in such cases by using two gallons of the modifying agent above described (oleic acid, ammonia, phenol and sodium resinate) for three hundred barrels of the emulsion, or I may use eight tenths gram of dry sodium oleate per gallon of oil. The emulsion containing the modifying agent mixed therewith as above described and heated to a suitable temperature, depending on the characteristics of the emulsion, for example, about 100° F., is pumped or passed into electrical dehydration apparatus of well known construction for example of the type such as described in patents to Frederick G. Cottrell and James B. Speed, No. 987,116, dated March 21, 1911, and to Frederick G. Cottrell and Allen C. Wright, No. 987,117, dated March 21, 1911, and in an article on page 1016 of Vol. 13 (1921) of the Journal of Industrial and Engineering Chemistry (American Chemical Society). Such apparatus is adapted to subject the emulsion to the action of an electrical field maintained between electrodes at high potential difference (say about 11,000 volts) provision being made if desired, for moving one of the electrodes during the operation. The electrical dehydration operation is carried out in a suitable tank or container (indicated at 5 in the drawing) which may constitute a grounded electrode, and a so-called high tension electrode 6 is supported and insulated within the tank 5 and may be connected to a source of high tension current, for example the secondary winding of a step-up transformer 7 whose primary winding is energized by an alternating current supply, suitable means being provided for control of such electrical supply means. Electrode 6 may be rotatably mounted in a bearing 8 and rotated by means 10 to cause disks 11 on the electrode to revolve in the liquid in tank 5. The emulsion or liquid is preferably passed from such container to a settling tank 13 wherein the oil and water are allowed to settle and separate, as in the above described patent to Cottrell and Speed, the oil and water being drained off at separate outlets 14 and 15, or such separate separation may in some cases be effected in the dehydrating tank itself, the water being drawn off at the bottom.

Suitable means such as steam coils, are provided for heating the emulsion prior to or during any one or more of the above described steps of the operation, namely, prior to or during the mixing of the modifying agent with the emulsion or prior to or during the electrical dehydrating operation, or prior to or during the settling operation. The temperature to which the emulsion should be heated may vary from 100° F. to 180° F. according to the character of the emulsion.

The modifying agent may be added directly to the electrical dehydrating apparatus above referred to, the circulating or agitating means in said apparatus serving to mix said agent with the emulsion.

In the above described operation the modifying agent described has the effect of changing or modifying the interfacial tension of the oil and water phase of the emulsion with the result that the water globules more readily coalesce under the action of the electro-static field in the electric dehydrator or de-emulsifying apparatus. The several steps of the process are therefore:

1. Modifying the interfacial tension of the emulsion by addition of a modifying agent.
2. Subjecting the emulsion to the action of electrical stress to break the emulsion and cause the water globules to coalesce into larger globules, and
3. Settling or separation of the water from the oil constituent of the emulsion by gravity or otherwise.

The process has been applied successfully to emulsions containing over 80% of water and by the operation of the described process the water content of the oil or emulsion has been reduced to 2% or less, and in some cases to as low as $\frac{1}{10}$ of 1%. It will be understood in treatment of ordinary petroleum emulsions a certain amount of the water can be settled out in a certain time by the action of heat alone, but in general it is not possible to separate more than a small amount of the water in this manner and in some cases substantially no water can be settled out by the action of heat alone within a reasonable time. Furthermore the action of a modifying agent may in some cases, or when used in large quantities, serve to enable a certain amount of the water to be settled out by the action of gravity alone when the emulsion is heated; and the electrical dehydration acting alone or in conjunction with heat is also generally capable of separating a certain proportion of the water present, and in some cases is sufficiently effective without the use of a modifying agent. My process however is of advantage, first, in connection with certain emulsions which cannot be successfully treated or de-emulsified in commercial operations by the action of heat alone or by the action of a modifying agent, together with heat, or by the action of an electrical dehydrating means together with heat, and in connection with such refractory emulsions, my process has the advantage that it enables de-emulsification of crude oils or products thereof which are not amenable to such ordinary processes of dehydration, and second, my process is of advantage in the de-emulsification and dehydration of emulsifying petroleums or petroleum products generally, by reason of the fact that by applying a modifying agent in connection with the electrical dehydration operation, a lower temperature may be used for the dehydrating operation, with a large saving in gasoline or other volatiles, and also with considerable saving in the amount of fuel required for the heating operation as well as reduction in the fire risk of the operation. For example a petroleum product which may require a temperature as high as 180° F. for successful de-emulsification with a modifying agent or electrical dehydration alone, may be successfully de-emulsified at a temperature as low as 100°F., when the electrical dehydration is carried on in the presence of the modifying agent. Moreover in such cases the capacity of a dehydration plant may be greatly increased by the use of the combined process, using a chemical modifying agent and electrical dehydration.

The amount of chemical modifying agent which is necessary to use for successful operation in connection with electrical dehydration is very much less than is necessary for separation of the constituents of the emulsion by the action of a chemical agent alone. The combined process therefore effects economy in heat, in the amount of chemical used, and in a greater output for a plant of given size.

Instead of the chemical modifying agents above mentioned I may use any other suitable chemical modifying agents, that is to say any chemical or chemicals capable of modifying the emulsion so as to render it more susceptible to separating action by electrical dehydration and settling.

The amount of chemical modifying agent used in my process is insufficient to break or separate the emulsion to the extent required in practice, by the action of the chemical agent alone, but is sufficient to so modify the emulsion that the constituents thereof can be effectively separated by the electrical dehydration action.

It will be understood that in the emulsion of oil and water herein referred to, the water may, and generally does contain other substances in solution and the word water as used herein is therefore to be taken to include such aqueous solutions.

What I claim is:

1. The process of treating an emulsion of oil and water which consists in adding to the emulsion a modifying agent adapted to change the interfacial tension of the constituents of the emulsion, subjecting the emulsion containing such modifying agent to the action of an electrical field to effect coalescence of the water globules and then subjecting the liquid to a separating action to separate the oil and water constituents thereof.

2. The process which consists in adding to an emulsion of oil and water a modifying agent adapted to change the interfacial tension of the constituents of said emulsion, subjecting the emulsion containing said modifying agent to electrical dehydrating action and then to settling operation to effect separation of the oil and water constituents of the emulsion.

3. The process which consists in adding to an emulsion of oil and water an agent adapted to modify the interfacial tension of the constituents of the emulsion, then subjecting the emulsion to the action of an electrical field between electrodes maintained at high potential difference, and then subjecting the liquid to settling operation to separate the oil and water constituents thereof.

4. The process which consists in mixing with an emulsion of oil and water an agent capable of modifying the interfacial tension of the constituents of the emulsion, then subjecting the emulsion while in a heated condition to the action of an electrical field to effect coalescence of the water globules in the emulsion and then subjecting the liquid to a settling operation to separate the oil and water constituents thereof.

5. The process of treating an emulsion of oil and water which consists in adding a chemical modifying agent to the emulsion, then subjecting the emulsion containing such modifying agent to the action of electrical stress, and then to settling operation to effect separation of the oil and water constituents of the emulsion.

6. The process for treating an emulsion of oil and water which consists in adding to the emulsion a modifying agent adapted to change the interfacial tension of the constituents of the emulsion and then subjecting the emulsion to electrical dehydration.

7. The process of treating an emulsion of oil and water which consists in adding a chemical modifying agent to the emulsion and then subjecting the emulsion containing such modifying agent to electrical dehydrating action.

In testimony whereof I have hereunto subscribed my name this 20th day of April 1923.

WILLIAM O. EDDY.